Patented Apr. 20, 1943

2,316,962

UNITED STATES PATENT OFFICE 2,316,962

CONTACT PARASITICIDE

George E. Lynn, Fred W. Fletcher, and Gerald H. Coleman, Midland, Mich., assignors to The Dow Chemical Company, Midland, Mich., a corporation of Michigan No Drawing. Application February 18, 1942, Serial No. 431,341

4 Claims. (Cl. 167—30)

This invention relates to parasiticides and is particularly directed to new compositions of matter adapted to be employed as contact poisons for the control of agricultural parasites.

According to the present invention a cyclohexyl cyclohexene or cyclohexyl lower-alkyl-cyclohexene is compounded with a suitable inert carrier and/or compatible parasiticidal toxicant to obtain a composition adapted to be employed for the control of agricultural insect, spider, and fungous pests. Compositions in which the substituted cyclohexenes are employed as active toxicants are characterized by low toxicity to plant life when applied as contact poisons. The cyclohexene compounds as a class are substantially insoluble in water, somewhat soluble in many organic solvents, and sufficiently inert as not to react with many known insecticidal toxicants. These compounds are high boiling liquids, relatively stable on exposure to light, air, and water, lacking in objectionable odor, and non-irritating and non-toxic to higher forms of animal life.

Compositions comprising the cyclohexyl cyclohexenes in aqueous dispersion, as constituents of oil emulsions, or in finely divided dust compositions may advantageously be employed for the control of such parasites as red spider, aphis, scale, fungi, etc. In preparing aqueous spray mixtures, the compounds may simply be dispersed in water in the presence of a suitable emulsifying agent, or may be incorporated in oil and water emulsions. An alternate procedure comprises mixing the toxicant with or depositing it on a water insoluble finely divided solid carrier to form a concentrate which may thereafter be dispersed in water. An ultimate concentration of from about 0.01 to 10 per cent by weight of the toxicant in the aqueous composition is required depending upon the particular parasite to be controlled and the presence or absence of supplementary toxicants.

In preparing dust compositions, the proportion of toxicant employed is dependent upon whether or not the dust is to be used as a concentrate for the preparation of aqueous dispersions or applied for pest control without further modification. If a concentrate is desired, from about 5 to 80 per cent by weight of the toxicant may be employed, depending upon the physical nature of the carrier selected. In finished dusting compositions from about 0.5 to 5.0 per cent of toxicant is preferred.

The substituted cyclohexene toxicant may advantageously be combined with other insecticidal materials such as pyrethrin- or rotenone-containing extracts, lead arsenate, petroleum oil, organic thiocyanates, phenothioxin, phenothiazene, nicotine derivatives, etc. When mixtures of the cyclohexene compounds with plant extract toxicants are employed, a greater than additive effect as regards toxicity is generally obtained in the resulting composition.

Among the solvents which may be employed as carriers for the substituted cyclohexene toxicants are petroleum distillates, carbon tetrachloride, chloroform, ethylene chloride, chlorobenzene, methyl ethyl ketone, methanol, ethanol, propanol, and water. In the preparation of concentrates and dust compositions, carriers such as bentonite, diatomaceous earth, kieselguhr, volcanic ash, pyrophyllite, talc, wood flour, finely divided carbon, and the like may be employed. Wetting agents which may be incorporated in either liquid or dust compositions include the alkali and alkaline earth metal caseinates, blood albumen, alkali metal salts of long chain aliphatic sulfates, partially neutralized sulfuric acid derivatives of petroleum oil and naturally occurring glycerides, sulfonated derivatives of phenols and aromatic hydrocarbons and their salts, soaps, condensation products of alkylene oxides with organic acids, alkanol amines, etc.

The cyclohexyl cyclohexene and cyclohexyl lower-alkyl-cyclohexenes are conveniently prepared by the dehydration of cyclohexyl cyclohexanols, and cyclohexyl alkyl-cyclohexanols such as 2-cyclohexyl cyclohexanol, 3-cyclohexyl cyclohexanol, 4-cyclohexyl cyclohexanol, 2-cyclohexyl 4-ethyl-cyclohexanol, 2-cyclohexyl 4.6-diisopropyl-cyclohexanol, 2-cyclohexyl 4-octyl-cyclohexanol, 4-cyclohexyl 6-tertiary-butyl-cyclohexanol, 4-cyclohexyl 2.6-diamyl-cyclohexanol, 3-cyclohexyl 2.4.6 - tri - isopropyl-cyclohexanol, etc.

The expression "lower alkyl" as herein employed refers to alkyl radicals containing from 1 to 8 carbon atoms, inclusive.

The following examples are illustrative of certain modes in which the invention may be employed, but are not to be construed as limiting the same.

Example 1

75 parts by weight of cyclohexyl cyclohexene boiling at 113°–115° C. at 15 m. m. pressure and having a specific gravity of 0.918 at 20°/4° C. was mixed with 12 parts by weight of sodium lauryl sulfate. This concentrate was dispersed in water in sufficient amount to give 3 pounds of the cyclohexyl cyclohexene per 100 gallons of mixture and applied for the control of Aphis rumicis on nasturtium. A 95 percent kill of the test organism was obtained with no injury to the host plant.

In a similar determination, the aqueous dispersion of cyclohexyl cyclohexene was sprayed on poplar trees infested with poplar aphids. 100 per cent control of the aphids was obtained with no injury to the trees.

*Example 2*

85 parts by weight of cyclohexyl cyclohexene, 13 parts by weight of a partially neutralized sulfonated sperm oil (sold as Nopco 1216), and 2 parts by weight of a solubilizing and dispersing agent (sold as Kemulsion base AA) were mixed together to obtain a miscible oil type parasiticidal concentrate. This concentrate was dispersed in water in sufficient amount to give two pounds of the cyclohexyl cyclohexene per 100 gallons and applied for the control of red spider on beans. An 89.2 per cent control of the spider was obtained. Against Aphis rumicis, this composition gave a kill of 92.2 per cent.

An equivalent composition in which cyclohexyl tertiarybutyl-cyclohexene (boiling at 163°–165° C. at 22 m. m. pressure and having a specific gravity of 0.890 at 25°/25° C.) was employed gave a kill against red spider of 85 per cent.

*Example 3*

An aqueous dispersion of cyclohexyl cyclohexene was tested according to the moist chamber method against the spores of Macrosporium solani. The method employed was essentially that described by S. E. A. McCallan in the Cornell University Agricultural Experiment Station Bulletin for May, 1930. According to this procedure, a dispersion of the water-insoluble toxicant dispersed in distilled water was introduced into a moist chamber and spores of the test organism suspended therein. After 48 hours no germination of the spores was observed. In control determinations in which no toxicant was employed, the spores developed in normal fashion.

We claim:

1. An agricultural parasiticide comprising as an active toxicant a compound selected from the group consisting of cyclohexyl cyclohexenes and cyclohexyl lower-alkyl-cyclohexenes.

2. An agricutural parasiticide comprising an inert diluent and as an active toxicant a compound selected from the group consisting of cyclohexyl cyclohexenes and cyclohexyl lower-alkyl-cyclohexenes.

3. An insecticidal composition comprising an inert diluent and as an active toxicant a cyclohexyl cyclohexene.

4. An insecticidal composition comprising an inert diluent and as an active toxicant a cyclohexyl lower-alkyl-cyclohexene.

GEORGE E. LYNN.
FRED W. FLETCHER.
GERALD H. COLEMAN.